US010469913B2

(12) United States Patent
Dixit et al.

(10) Patent No.: US 10,469,913 B2
(45) Date of Patent: **\*Nov. 5, 2019**

(54) WIRELESS TCP LINK STATE MONITORING BASED VIDEO CONTENT ADAPTATION AND DATA DELIVERY

(71) Applicant: CISCO TECHNOLOGY, INC., San Jose, CA (US)

(72) Inventors: Sanjay Dixit, Cupertino, CA (US); Biswaranjan Panda, Santa Clara, CA (US); Jayaraman Iyer, San Jose, CA (US); Bhaskar Bhupalam, Santa Clara, CA (US)

(73) Assignee: Cisco Technology, Inc., San Jose, CA (US)

(\*) Notice: Subject to any disclaimer, the term of this patent is extended or adjusted under 35 U.S.C. 154(b) by 28 days.

This patent is subject to a terminal disclaimer.

(21) Appl. No.: 15/186,447

(22) Filed: Jun. 18, 2016

(65) Prior Publication Data

US 2016/0295295 A1   Oct. 6, 2016

Related U.S. Application Data

(63) Continuation of application No. 13/335,388, filed on Dec. 22, 2011, now Pat. No. 9,392,337.

(51) Int. Cl.
*H04N 21/61* (2011.01)
*H04N 21/647* (2011.01)
(Continued)

(52) U.S. Cl.
CPC ..... *H04N 21/6131* (2013.01); *H04L 65/4084* (2013.01); *H04L 65/602* (2013.01);
(Continued)

(58) Field of Classification Search
CPC ............. H04H 60/27; H04N 21/41407; H04N 7/17318; H04N 21/47202; H04N 7/17336; H04N 21/2402; H04N 21/25891
(Continued)

(56) References Cited

U.S. PATENT DOCUMENTS 6,442,599 B1   8/2002   DuLac et al.
8,840,476 B2\*  9/2014   Perry ................. H04L 65/4069
                                                    463/42
(Continued)

FOREIGN PATENT DOCUMENTS

WO   WO-2013006168 A1 \*   1/2013   ......... H04N 21/2343

*Primary Examiner* — Ngoc K Vu
(74) *Attorney, Agent, or Firm* — Patterson + Sheridan, LLP

(57) ABSTRACT

Systems and methods are used for receiving a video request from a user equipment for video to be downloaded; determining a link bandwidth status associated with the user equipment; in response to the link bandwidth status associated with the user equipment, determining whether to implement one or more additional processing functions associated with the video delivery; during the video delivery, repeating the determining such that the one or more additional processing functions associated with the video delivery can be implemented or not implemented at different times during the video delivery. These processing functions can include transrating, HTTP optimization, TCP optimization, and video pacing.

20 Claims, 6 Drawing Sheets

(51) Int. Cl.
*H04L 29/06* (2006.01)
*H04W 28/02* (2009.01)
*H04L 29/08* (2006.01)

(52) U.S. Cl.
CPC ....... *H04L 69/04* (2013.01); *H04N 21/64738* (2013.01); *H04N 21/64784* (2013.01); *H04W 28/0273* (2013.01); *H04W 28/0289* (2013.01); *H04L 67/32* (2013.01); *H04L 69/161* (2013.01)

(58) Field of Classification Search
USPC .............................................. 725/93, 95, 116
See application file for complete search history.

(56) References Cited

U.S. PATENT DOCUMENTS

| | | | |
|---|---|---|---|
| 9,392,337 B2 * | 7/2016 | Dixit | H04N 21/6131 |
| 2005/0213502 A1 * | 9/2005 | Convertino | H04L 1/0014 370/229 |
| 2005/0248652 A1 | 11/2005 | Firestone et al. | |
| 2007/0025359 A1 | 2/2007 | Andriantsiferana et al. | |
| 2007/0156924 A1 | 7/2007 | Ramalingam et al. | |
| 2007/0201469 A1 | 8/2007 | Iyer et al. | |
| 2008/0022684 A1 | 1/2008 | Baldwin et al. | |
| 2008/0279217 A1 | 11/2008 | McDonald et al. | |
| 2008/0282307 A1 | 11/2008 | McDonald et al. | |
| 2008/0282308 A1 | 11/2008 | McDonald et al. | |
| 2009/0160929 A1 | 6/2009 | Wu et al. | |
| 2010/0014594 A1 | 1/2010 | Beheydt et al. | |
| 2010/0218231 A1 | 8/2010 | Frink et al. | |
| 2010/0268836 A1 | 10/2010 | Jabri et al. | |
| 2010/0312828 A1 | 12/2010 | Besserglick et al. | |
| 2011/0216785 A1 | 9/2011 | Begen et al. | |
| 2011/0217025 A1 | 9/2011 | Begen et al. | |
| 2011/0228673 A1 | 9/2011 | Grayson et al. | |
| 2011/0283203 A1 | 11/2011 | Periyannan et al. | |
| 2012/0005365 A1 | 1/2012 | Ma et al. | |
| 2012/0311134 A1 * | 12/2012 | Pantos | H04L 47/10 709/224 |
| 2013/0021933 A1 | 1/2013 | Kovvali et al. | |
| 2013/0167181 A1 | 6/2013 | Dixit et al. | |

\* cited by examiner

WIRELESS TCP LINK STATE MONITORING BASED VIDEO CONTENT ADAPTATION AND DATA DELIVERY

RELATED APPLICATION

This Application is a continuation (and claims the benefit of priority under 35 U.S.C. § 120) of U.S. application Ser. No. 13/335,388, filed on Dec. 22, 2011, entitled "WIRELESS TCP LINK STATE MONITORING BASED VIDEO CONTENT ADAPTATION AND DATA DELIVER," inventors Sanjay Dixit, et al. The disclosure of the prior application is hereby incorporated by reference.

FIELD OF THE DISCLOSURE

This disclosure relates generally to a system and method for delivering videos in a mobile communications system.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipments, including, for example, satellite communications systems, portable digital assistants (PDAs), laptop computers, and user equipments (e.g., cellular telephones, user equipment). Such devices can connect to a network (e.g., the Internet) as long as the user is within range of such a wireless communication technology. Such devices can use connections to the wireless networks to download video data.

The increase in video data traffic can strain wireless network operators' existing packet core elements. The increase in video data traffic can overload network devices in wireless networks, and it may even cause wireless network service disruptions. The demand for video data over wireless networks is not expected to slow, especially as mobile devices become more sophisticated and as users become more dependent on mobile devices.

DESCRIPTION OF EXAMPLE EMBODIMENTS

Overview

Figure 1:
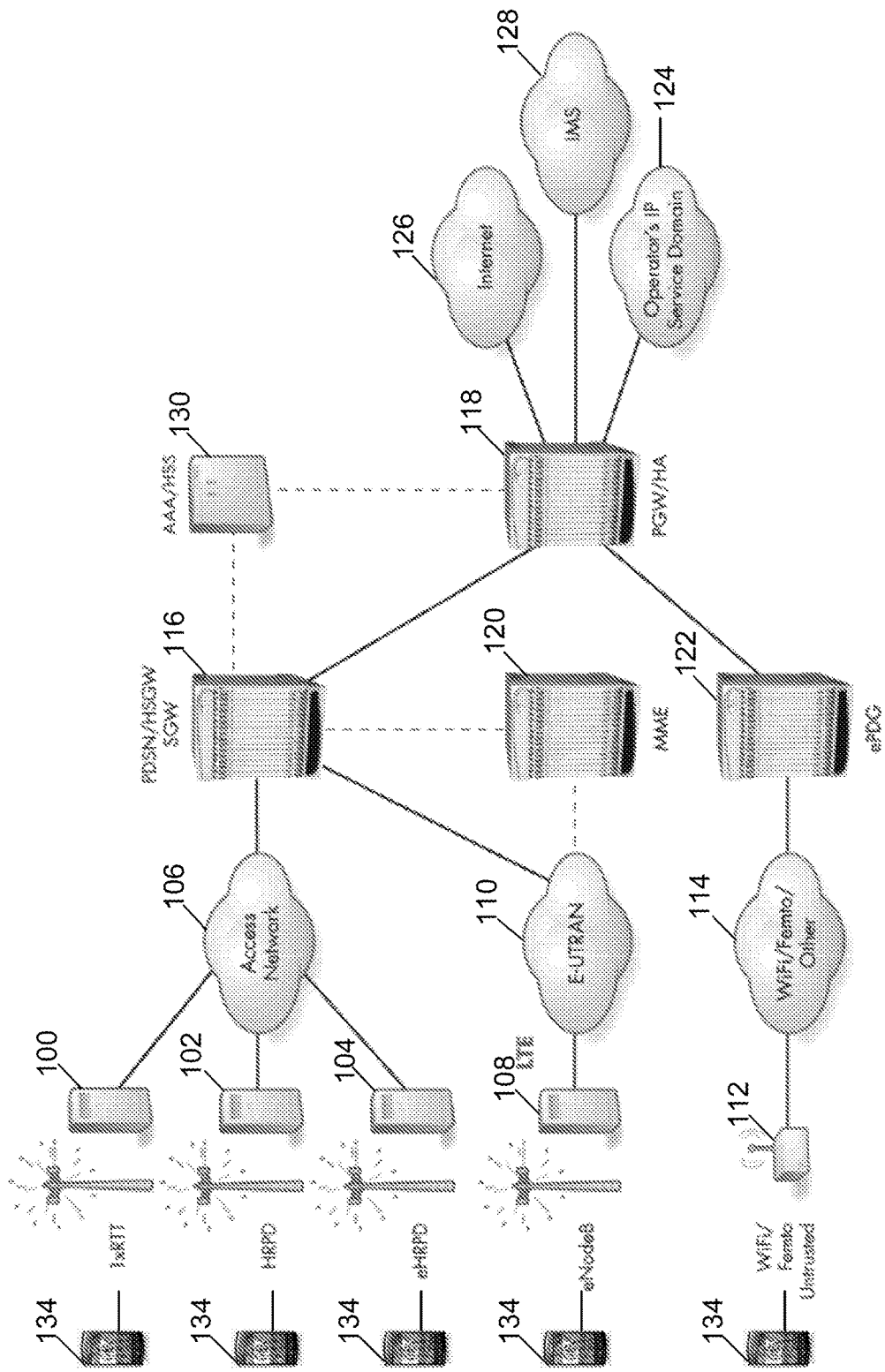
FIGS. 1-2 illustrate a communications network including a long term evolution (LTE) topology in accordance with certain embodiments.

In certain embodiments, systems and methods are described for receiving a video request from a user equipment for video to be downloaded; determining a link bandwidth status associated with the user equipment; determining whether to implement one or more additional processing functions associated with the video delivery based at least in part on the link bandwidth status associated with the user equipment; and during the video delivery, repeating the determining such that the one or more additional processing functions associated with the video delivery can be implemented or not implemented at different times during the video delivery. These processing functions can include transrating, HTTP optimization, TCP optimization, and video pacing.

EXAMPLE EMBODIMENTS

In a video delivery system, certain processing functions can be implemented in one or more network devices and can affect the video delivery by improving delivery for the network device. These functions include video transrating, HTTP optimization, TCP transport optimization, and video pacing.

Transrating is a delivery function that is used to provide stable video services with constrained network resources, and includes adapting videos before delivering them to users. In one example, a network operator receives a request for a high definition (HD) video (i.e., 1920×1080 pixels), but because the network is busy, the network operator cannot stream the video in real-time. Network operators can deliver such a video in real-time by adapting the video to the network condition. One way to adapt the video is to reduce its file size Reducing the file size can involve down-sampling the video, for example, to 1280×720 pixels, adjusting the video quality (e.g., compression rates, color depths), or adjusting frame rates (e.g., the number of frames per second).

Video transrating can involve modifying the video compression format. For instance, if user equipment supports a compression format that is more efficient than the video's current compression format, the video can be decompressed and re-compressed using a more efficient compression format. Network operators can perform video transcoding within a gateway in an inline manner or using a separate content adaptation engine (CAE). A CAE can be stand-alone hardware module located between a gateway and a video server, or can be emulated using software solutions running on a cloud or in a data center.

Video pacing is another delivery function. In a regular progressive download, a user equipment is configured to download video contents as rapidly as possible, regardless of the network conditions. While this strategy is useful when the network connection is slow, this strategy is inefficient when the network connection is fast because the user may not view all of the downloaded video. For example, when a user selects a video from YouTube, the user equipment can download full 30 seconds of the video almost instantaneously. However, of the 30 seconds of the video, the user may only view the first 3 seconds of the video and decide to stop the video, in which case the remaining 27 seconds of the video are not viewed and thus wasted. The goal of video pacing is to limit the video download speed so that a user equipment downloads just enough content for in-time playback. While the video download speed can be adjusted at a video server, the video download speed can also be adjusted at a network device in the communication path between a user equipment and the video server.

HTTP optimization can be used when the video content is formulated as a HTTP payload to reduce HTTP traffic bytes through processes such as re-writing to use a browser's capabilities or zipping (i.e., compressing).

TCP optimization includes changing TCP connection parameters during transmission. These parameters can include packet size, error handling, and window size.

FIG. 1 illustrates a communications network that implements a video delivery scheme in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology, can use a transceiver shown generally at 112 to connect user equipment 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WiFi/Femto/other transceiver 112. On the packet core side, the anchor gateway can communicate with the operator's IP service domain 124, the internet 126, IP multimedia subsystem (IMS) 128, a data center 132, and a video server 136. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving the user equipment. Even when the user equipment 134 is detached from the network, the HSS 130 maintains the binding information until the user equipment 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communications network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and POW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The POW also provides an anchor for mobility between 3GPP and non-3GPP technologies such as WiMAX and 3GPP2 standards (CDMA 1× and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
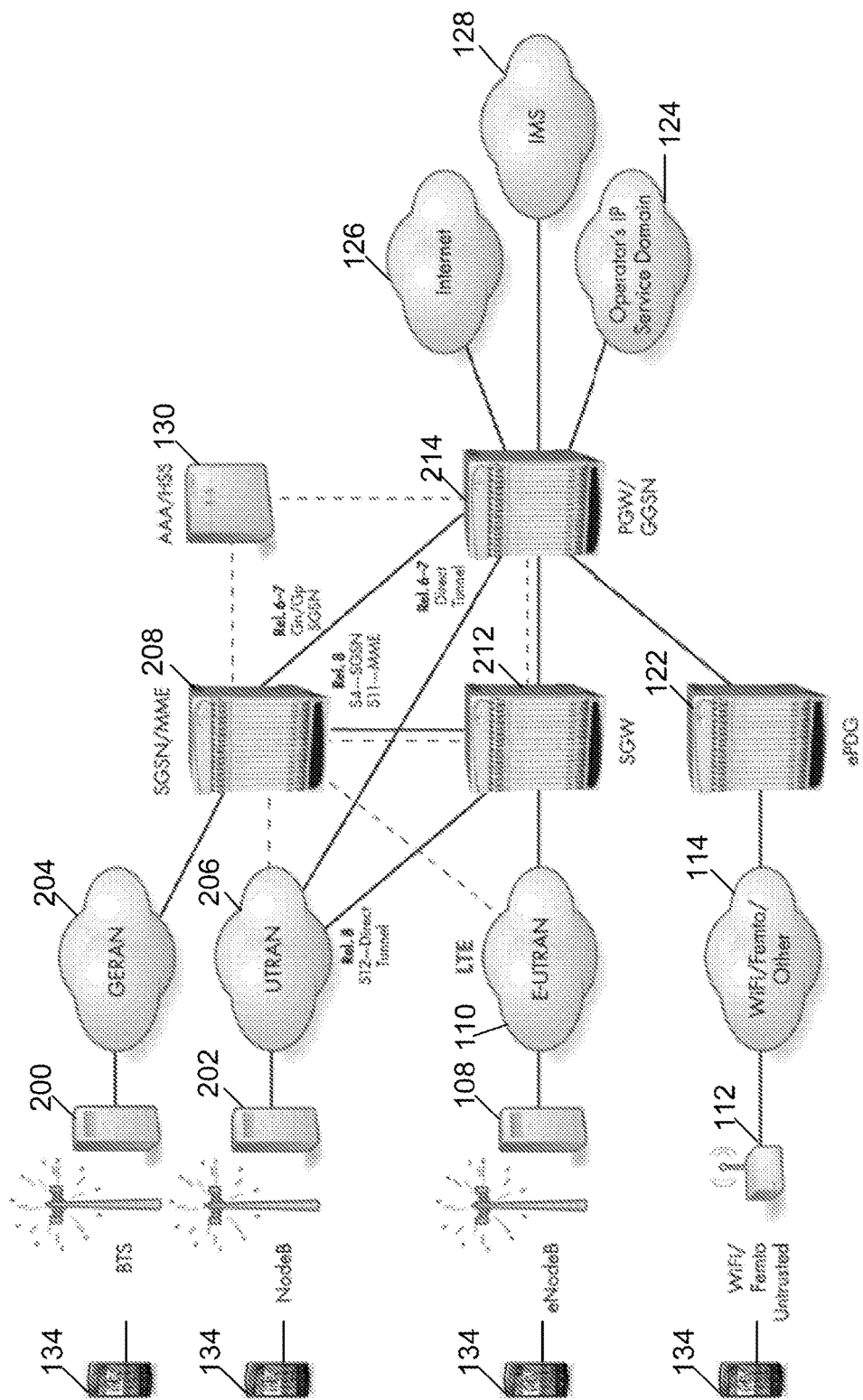

FIG. 2 illustrates a communications network that implements a video delivery scheme in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, parts of the video delivery system can be implemented on gateways, such as PGW/HA 118, PDSN/HSGW/SGW 116, SGSN/MME 208, PGW/GGSN 214, or SGW 212 and/or data centers 132. The gateways can access and maintain information relating to the communication session, the subscriber, the radio bearers, and the policies relating to the communication session. The gateways may be used to provide various services to user equipment 134 and implement the quality of service (QoS) on packet flows. Several of these functions are used in providing, for example, voice over IP (VoIP) routing and enhanced services, such as enhanced charging, stateful firewalls, traffic performance optimization (TPO). The communications networks also allow provision of applications such as VoIP, streaming video, streaming music, multi-user gaming, location based services, and a variety of delivered to a mobile node. Residing within the gateways can be one or more network processing units, line cards, as well as packet and voice processing cards.

Figure 3:
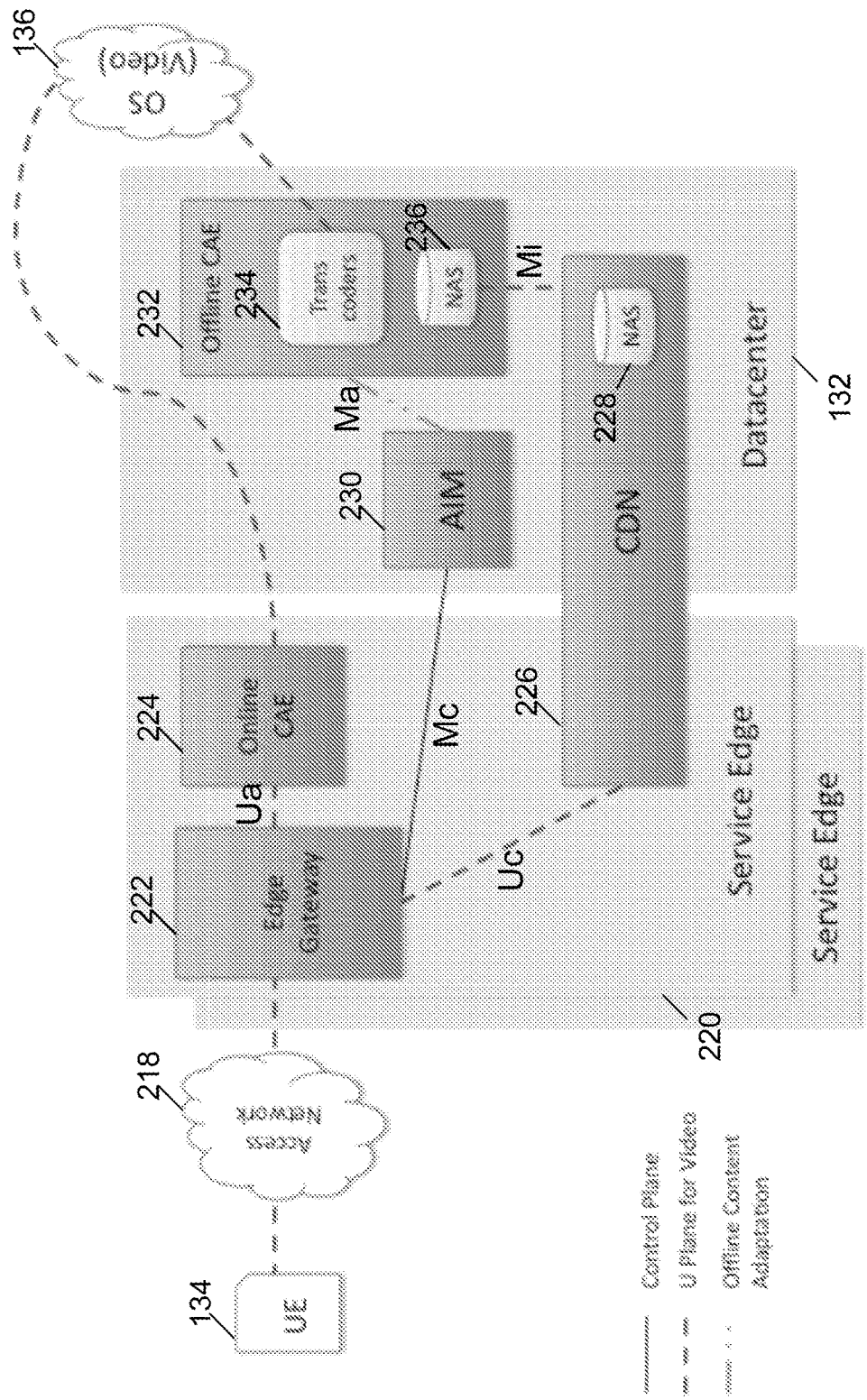
FIG. 3 illustrates a communications network in which an intelligent video delivery scheme is implemented in accordance with certain embodiments.

FIG. 3 illustrates an example of a system that delivers video in accordance with certain embodiments. FIG. 3 includes user equipment (UE) 134, an access network 218, a service edge 220 that includes an edge gateway 222, an online content adaptation engine (CAE) 224, a portion of a content distribution network (CDN) 226, a CDN cache 228, which includes a network attached storage in a CDN 226, and a data center 132 that includes an asset information manager (AIM) 230, an offline content adaptation engine 232, at least one audio/video transcoder 234 in the offline CAE 232, a cache 236 associated with the offline CAE 232, and a video originating server (OS) 136.

A network device can communicate with other network devices over interfaces. For example, the edge gateway 222 can communicate with the AIM 230 over a control plane interface such as an Mc interface, with an online CAE 224 over a user plane interface such as an Ua interface, and with a CDN 226 and its components over a user plane interface such as a Uc interface. Also, the AIM 230 can communicate with the offline CAE 232 over a control plane interface such as an Ma interface, and with the offline CAE 232 over a control plane interface such as an Mi interface.

The edge gateway 222 can send a content location request to the AIM 230 to determine how to download the requested video with an indicated level of adaptation. When the AIM 230 receives the content location request, the AIM 230 determines if the requested video with the indicated level of adaptation is already available from the CDN cache 228. If so, the AIM 230 sends a content location response to the edge gateway 222, indicating that the CDN cache 228 already has an adapted version of the requested video and that the adapted video can be downloaded from the CDN 226; if not, the AIM 230 sends a content location response indicating that the edge gateway 222 downloads the video from the online CAE 224. The edge gateway 222 analyzes the content location response and sends a video request to the device indicated by the content location response. This video request includes the requested video identifier and the level of adaptation for the requested video.

Figure 4:
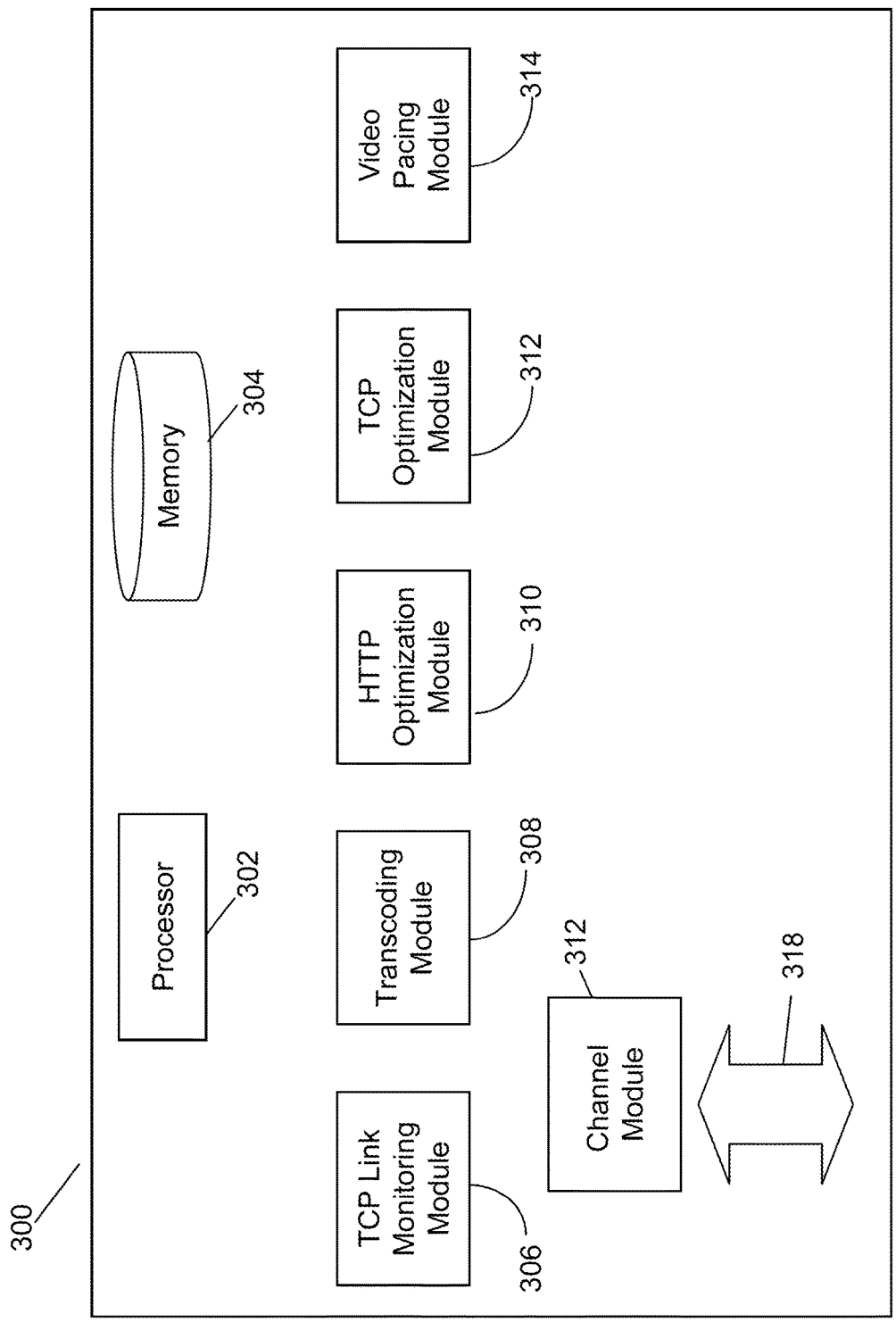
FIG. 4 shows a logical diagram of an edge gateway in accordance with certain embodiments.

FIG. 4 illustrates a logical view of a video gateway 300 in accordance with certain embodiments of a video delivery system. The gateway 300 can include one or more of a processor 302, a memory 304, a TCP link monitoring module 306, transrating module 308, HTTP optimization module 310, TCP optimization module 312, video pacing module 314, a channel module 316, and interface 318.

According to embodiments described herein, when a request for a video is received, the gateway starts polling the user's link bandwidth status information with TCP monitoring function. The bandwidth status is used to determine whether additional functions will be used with the video delivery. This monitoring of the status can take place on an ongoing basis, such that the functions can be turned on and off during the video delivery download.

The wireless TCP link capacity is estimated by monitoring TCP parameters including round-trip time (RTT), bytes being exchanged, and congestion conditions. The statistics are then stored. The bandwidth can be estimated by calculating a ratio of a number of bytes of acknowledged TCP payload over every RTT to create a rate sample. This rate sample is then filtered by a weighted moving average to derive a per-flow average bandwidth estimate for every RTT interval.

For transrating, the video encoded bit rate is compared to the available estimated link bandwidth. If the encoding rate is higher than the link bandwidth, transrating is implemented to reduce the overall size of the video. The amount of the reduction is based on the difference between the link bandwidth and the video encoding rate within a maximum configured reduction limit. If the link bandwidth is higher than the video encoded rate, the transrating function need not be implemented and the data can be delivered as is.

Similarly, one or more aspects of HTTP optimizations and TCP transport optimization, and/or video pacing can be implemented or not implemented based on the bandwidth status associated with the UE.

By limiting these forms of additional processing to times when the bandwidth status is low, these resource-intensive functions can be performed in states of high congestion, but not necessarily in states of low congestion.

The system can implement any one or more of these four functions, and within each function, can implement one or more of the methods for optimizing. Furthermore, the different functions can be turned on and off during delivery of the video, such that, for example, a video may be transrated to a lower data rate for a portion of the video, while having a higher data rate for other portions of the video. The functions can thus be turned on and off as needed, and different combinations of functions can be turned on and off depending on the comparison of the subscribers bandwidth status.

The polling for the linked bandwidth status and the turning on and off of functions can be done in any of a number of ways. For example, it can be periodic based on a period of time (such as a number on the order of 2-10 seconds) or a number of bytes and in a uniform manner, or the frequency can change based on conditions, or based on the number of times the status is indicated to be in a particular state; for example, if polling repeatedly shows a congested state, the frequency of polling can become less frequent based on an assumption that the status is not changing. Alternatively, the polling can be done more frequently in one of the congested and non-congested state, compared to the other of the congested state and non-congested state.

The system can use a single threshold for the bandwidth status for all of the identified functions (transrating, HTTP optimization, TCP optimization, and video pacing), or can have multiple thresholds with different points at which the function is implemented or not implemented.

Memory 304 can be implemented in a variety of fashions such as a non-transitory computer readable medium, a programmable read only memory (PROM), a magnetic media, or flash memory, and can include a group of different memory devices. Modules 306, 308, 310, 312, and 314 can run on one or more processors, shown and referred to collectively as processor 302, that executes instructions or computer code. The modules may also be implemented in hardware using an application specific integrated circuit (ASIC), programmable logic array (PLA), or any other integrated circuit.

One or more interfaces, shown collectively as interface 318, can provide an input and/or output mechanism to communicate with other network devices. The interface 318 can provide communication with other gateways, CAEs, application servers, and user equipment 134, as well as other core network nodes and origin servers to send and receive control data. The interface 318 can be implemented in hardware to send and receive signals in a variety of mediums, such as optical, copper, and wireless, and in a number of different protocols some of which may be non-transient.

Modules 306, 308, 310, 312, and 314 are all shown as being within one gateway. However, these modules can be distributed and/or located in multiple network devices. For example, a transrating module could be located in a CAE (FIG. 3). Similarly, other modules can be located in other devices, coupled to the gateway. If the gateway is a PGW, it can receive information regarding the link status via MSGW and/or MME.

User Equipment and Gateway

The user equipment 134 described above can communicate with a plurality of radio access networks using a plurality of access technologies and with wired communications networks. The user equipment 134 can be a smart phone offering advanced capabilities such as word processing, web browsing, gaming, e-book capabilities, an operating system, and a full keyboard. The user equipment 134 may run an operating system such as Symbian OS, iPhone OS, RIM's Blackberry, Windows Mobile, Linux, Palm WebOS, and Android. The screen may be a touch screen that can be used to input data to the user equipment 134 and the screen can be used instead of the full keyboard. The user equipment 134 may have the capability to run applications or communicate with applications that are provided by servers in the communications network. The user equipment 134 can receive updates and other information from these applications on the network.

The user equipment 134 also encompasses many other devices such as televisions (TVs), video projectors, set-top boxes or set-top units, digital video recorders (DVR), computers, netbooks, laptops, and any other audio/visual equipment that can communicate with a network. The user equipment 134 can also keep global positioning coordinates, profile information, or other location information in its stack or memory. The user equipment 134 can have a memory such as a computer readable medium, flash memory, a magnetic disk drive, an optical drive, a programmable read-only memory (PROM), and/or a read-only memory (ROM). The user equipment 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment 134 can also provide a variety of user interfaces such as a keyboard, a touch screen, a trackball, a touch pad, and/or a mouse. The user equipment 134 may also include speakers and a display device in some embodiments.

The network device of FIG. 4 can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDS), a foreign agent (FA), and/or home agent (HA). The intelligent video delivery scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 5:
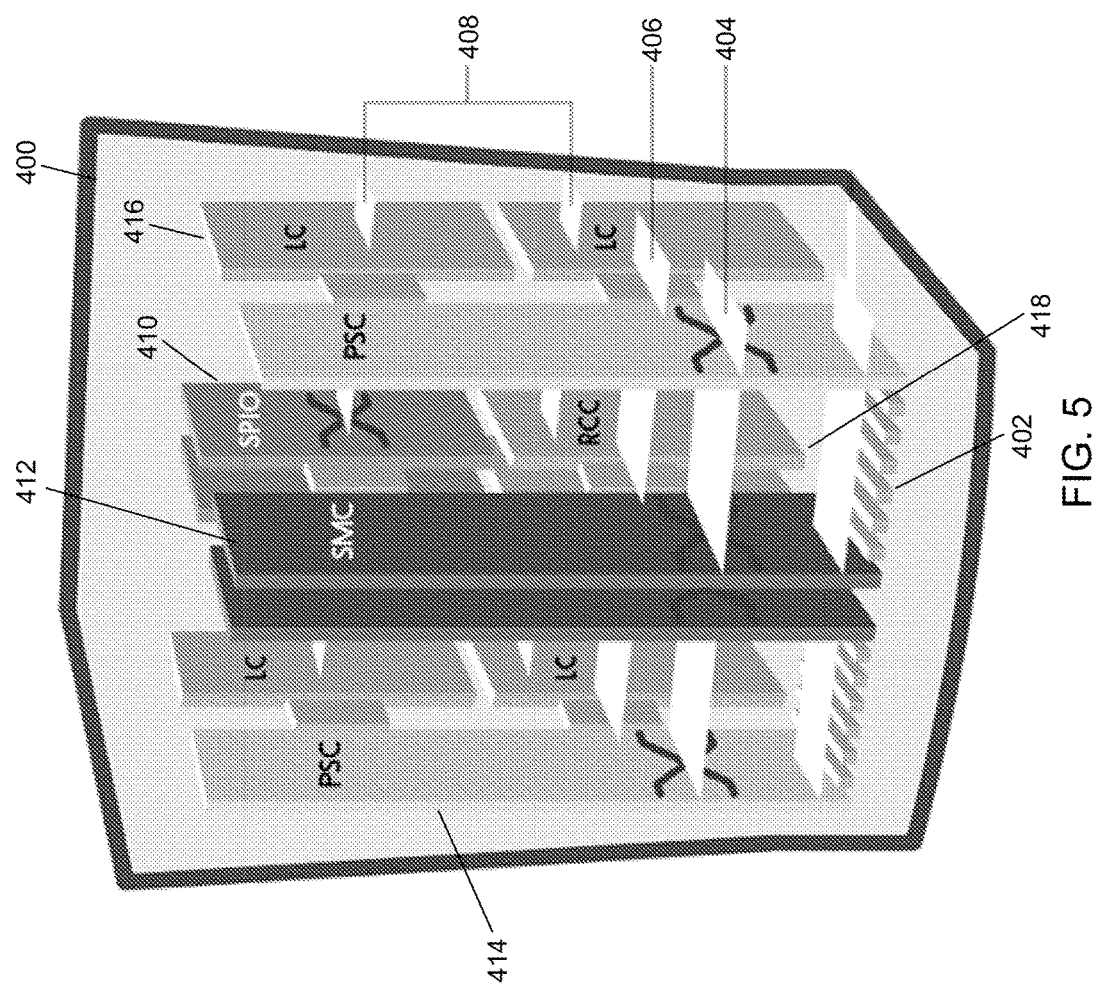
FIG. 5 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 5 illustrates an implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card. (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 6:
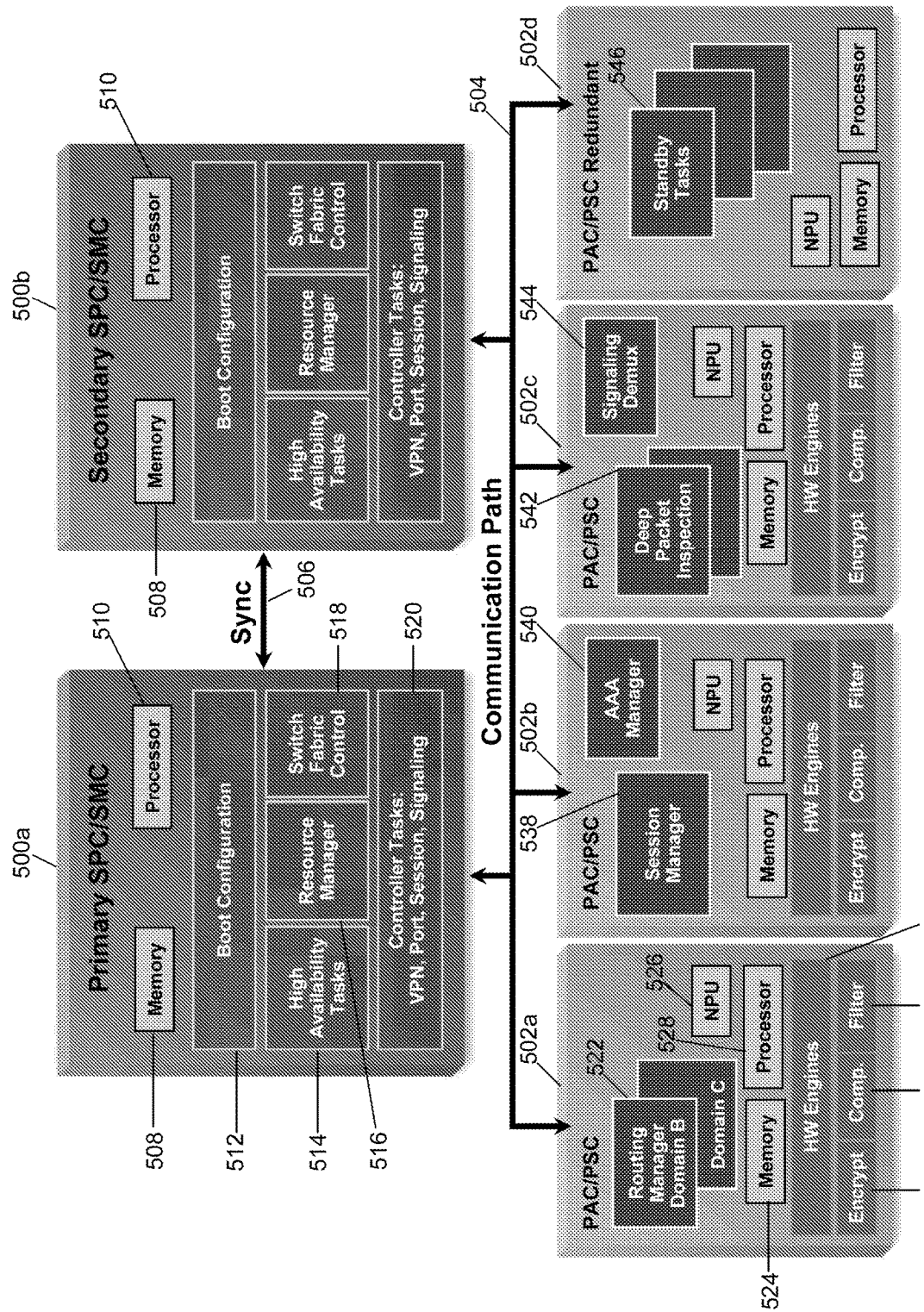
FIG. 6 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 6 illustrates a logical view of the software architecture of a network device in accordance with certain embodiments. As shown, the software and hardware can be distributed within the network device and across different circuit boards, processors, and memory. FIG. 6 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors an tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment 134.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment 134. A session allows user equipment 134 to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

While the application above uses the term "optimization," it should be understood that this term is not being used in some absolute sense to indicate some highest possible performance, but rather is used in a manner in which it is often used to mean the implementation of some function that is intended to provide some improvement or benefit under the circumstances.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the bandwidth could be estimated in other ways.

We claim:

1. A computer-implemented method for adaptive delivery of video content based on wireless link state monitoring, the computer-implemented method comprising:
   receiving, at a network device, from a user equipment via a wireless link, a request to download a video from a remote server, the video having an associated video encoding bit rate;
   determining, by the network device, an estimated available bandwidth of the wireless link, based at least in part on monitoring, at multiple different times during the video delivery, a bandwidth status of the wireless link;
   determining, by the network device, at multiple different times during the video delivery, whether to implement at least one processing function associated with delivery of the video, wherein whether to implement the at least one processing function is determined based at least in part on whether the video encoding bit rate is higher than the estimated available bandwidth of the wireless link; and
   upon determining to implement the at least one processing function associated with delivery of the video, implementing, by operation of one or more computer processors of the network device, at least a portion of the at least one processing function associated with the delivery of the video, the at least one processing function comprising transrating, according to a determined transrating rate, video data received from the remote server in order to reduce an amount of data to be delivered to the user equipment for the video, wherein the transrating rate is determined based at least in part on a difference between the video encoding bit rate and the estimated available bandwidth of the wireless link.

2. The computer-implemented method of claim 1, wherein the at least one processing function further comprises Hypertext Transfer Protocol (HTTP) optimization.

3. The computer-implemented method of claim 1, wherein the at least one processing function further comprises Transmission Control Protocol (TCP) transport optimization, including modification of at least one TCP parameter.

4. The computer-implemented method of claim 1, wherein the at least one processing function further comprises video pacing.

5. The computer-implemented method of claim 1, wherein the at least one processing function includes two or more of transrating, Hypertext Transfer Protocol (HTTP) optimization, Transmission Control Protocol (TCP) optimization, and video pacing.

6. The computer-implemented method of claim 1, wherein the determining is done periodically during the video delivery every 2-10 seconds.

7. The computer-implemented method of claim 1, wherein the bandwidth status comprises a plurality of comprising Transmission Control Protocol (TCP) parameters, the plurality of TCP parameters including round-trip time, bytes being exchanged, and congestion conditions.

8. The computer-implemented method of claim 7, wherein the estimated available bandwidth is determined by:
   determining a rate sample by computing, over each of a plurality of round-trip intervals, a ratio of a number of bytes of acknowledged TCP payload to a number of bytes of requested TCP payload; and
   filtering the rate sample by a weighted moving average in order to derive a per-flow average bandwidth estimate for the plurality of round-trip intervals.

9. The computer-implemented method of claim 8, wherein the network device is configured to:
   determine whether the video has been previously processed in accordance with the at least one processing function and stored in memory; and
   upon determining that the video has been previously processed according to the at least one processing function and stored in the memory, download the previously processed video from the memory to the user equipment.

10. The computer-implemented method of claim 9, wherein the network device is further configured to:
   upon determining that the video has not been previously processed according to the at least one processing function and stored in the memory, send, from the network device to a content adaptation engine, a video request including an identifier of the video and a level of video adaptation based on the estimated available bandwidth of the wireless link.

11. The computer-implemented method of claim 10, wherein the network device is further configured to:
   during the video delivery, repeat the determining of the estimated available bandwidth of the wireless link, such that the at least one processing function can be selected for implementing or not implementing at different times during the video delivery.

12. The computer-implemented method of claim 11, wherein the at least one processing function further includes Hypertext Transfer Protocol (HTTP) optimization, TCP optimization, and video pacing, wherein the determining is done periodically during the video delivery every 2-10 seconds.

13. A network device for adaptive delivery of video content based on wireless link state monitoring, the network device comprising:
one or more computer processors; and
a memory containing a program executable by the one or more computer processors to:
receive, from a user equipment via a wireless link, a request to download a video from a remote server, the video having an associated video encoding bit rate;
determine an estimated available bandwidth of the wireless link, based at least in part on monitoring, at multiple different times during the video delivery, a bandwidth status of the wireless link;
determine, at multiple different times during the video delivery, whether to implement at least one processing function associated with delivery of the video, wherein whether to implement the at least one processing function is determined based at least in part on whether the video encoding bit rate is higher than the estimated available bandwidth of the wireless link; and
upon determining to implement the at least one processing function associated with delivery of the video, implement, at the network device, at least a portion of the at least one processing function associated with the delivery of the video, the at least one processing function comprising transrating, according to a determined transrating rate, video data received from the remote server in order to reduce an amount of data to be delivered to the user equipment for the video, wherein the transrating rate is determined based at least in part on a difference between the video encoding bit rate and the estimated available bandwidth of the wireless link.

14. The network device of claim 13, wherein the at least one processing function further comprises HTTP optimization.

15. The network device of claim 13, wherein the at least one processing function further comprises TCP transport optimization, including modification of at least one TCP parameter.

16. The network device of claim 13, wherein the at least one processing function further comprises video pacing.

17. The network device of claim 13, wherein the at least one processing function includes two or more of transrating, HTTP optimization, TCP optimization, and video pacing.

18. The network device of claim 13, wherein the determining whether to implement the at least one processing function is done periodically during video delivery every 2-10 seconds.

19. One or more non-transitory media comprising logic for adaptive delivery of video content based on wireless link state monitoring, the logic executable to:
receive, at a network device, from a user equipment via a wireless link, a request to download a video from a remote server, the video having an associated video encoding bit rate;
determine, by the network device, an estimated available bandwidth of the wireless link, based at least in part on monitoring, at multiple different times during the video delivery, a bandwidth status of the wireless link;
determine, by the network device, at multiple different times during the video delivery, whether to implement at least one processing function associated with delivery of the video, wherein whether to implement the at least one processing function is determined based at least in part on whether the video encoding bit rate is higher than the estimated available bandwidth of the wireless link; and
upon determining to implement the at least one processing function associated with delivery of the video, implementing, by operation of one or more computer processors when executing the logic, at least a portion of the at least one processing function associated with the delivery of the video, the at least one processing function comprising transrating, according to a determined transrating rate, video data received from the remote server in order to reduce an amount of data to be delivered to the user equipment for the video, wherein the transrating rate is determined based at least in part on a difference between the video encoding bit rate and the estimated available bandwidth of the wireless link.

20. The one or more non-transitory media of claim 19, wherein the at least one processing function further comprises video pacing.

* * * * *

UNITED STATES PATENT AND TRADEMARK OFFICE
CERTIFICATE OF CORRECTION

PATENT NO. : 10,469,913 B2  
APPLICATION NO. : 15/186447  
DATED : November 5, 2019  
INVENTOR(S) : Sanjay Dixit et al.

Page 1 of 1

It is certified that error appears in the above-identified patent and that said Letters Patent is hereby corrected as shown below:

In the Specification

In Column 2, Line 29, after "the" insert -- HD --.

In Column 2, Line 32, delete "size" and insert -- size. --, therefor.

In Column 2, Line 45, after "be" insert -- a --.

In Column 4, Line 14, delete "POW)." and insert -- PGW). --, therefor.

In Column 4, Line 37, delete "POW" and insert -- PGW --, therefor.

In Column 8, Line 46, delete "(PDS)," and insert -- (PDSN), --, therefor.

In Column 9, Line 46, delete "card." and insert -- card --, therefor.

In Column 12, Line 21, delete "an" and insert -- and --, therefor.

Signed and Sealed this  
Third Day of March, 2020

Andrei Iancu  
*Director of the United States Patent and Trademark Office*